United States Patent
Baldwin et al.

(10) Patent No.: US 10,210,191 B2
(45) Date of Patent: Feb. 19, 2019

(54) ACCELERATED ACCESS TO OBJECTS IN AN OBJECT STORE IMPLEMENTED UTILIZING A FILE STORAGE SYSTEM

(71) Applicant: International Business Machines Corporation, Armonk, NY (US)

(72) Inventors: Duane M. Baldwin, Mantorville, MN (US); John T. Olson, Tucson, AZ (US); Sachin C. Punadikar, Pune (IN); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 834 days.

(21) Appl. No.: 14/220,921

(22) Filed: Mar. 20, 2014

(65) Prior Publication Data
US 2015/0269203 A1    Sep. 24, 2015

(51) Int. Cl.
*G06F 17/30* (2006.01)
(52) U.S. Cl.
CPC .. *G06F 17/30321* (2013.01); *G06F 17/30091* (2013.01)
(58) Field of Classification Search
CPC ......... G06F 17/30321; G06F 17/30067; G06F 17/3032
See application file for complete search history.

(56) References Cited

U.S. PATENT DOCUMENTS 5,745,888 A * 4/1998 Bauer ............... G06F 17/30123
6,145,088 A * 11/2000 Stevens ............... G06F 11/0709
714/2
7,228,299 B1 * 6/2007 Harmer ............ G06F 17/30106
707/741
7,739,318 B2   6/2010 Zayas et al.
8,280,932 B2   10/2012 Horn
8,484,172 B2   7/2013 Saake et al.
8,489,658 B2   7/2013 Turner et al.
(Continued)

FOREIGN PATENT DOCUMENTS

CN   102693286 A   9/2012
CN   103229173 A   7/2013

OTHER PUBLICATIONS

International Search Report and Written Opinion from PCT Application No. PCT/IB2015/051978, dated Jul. 22, 2015.
(Continued)

*Primary Examiner* — Rehana Perveen
*Assistant Examiner* — Huen Wong
(74) *Attorney, Agent, or Firm* — Zilka-Kotab, P.C.

(57) ABSTRACT

In one embodiment, a method for creating an object includes creating an object in an object store making use of a file system, obtaining an index node (inode) identifier (ID) for an inode associated with the object, creating an object ID for the object, wherein the object ID is unique from any other object IDs in the object store, merging the object ID with the inode ID, and modifying the inode to include at least the object ID. In another embodiment, a system includes a processor and logic integrated with and/or executable by the processor, the logic being configured to: create an object in an object store making use of a file system, obtain an inode ID for an inode associated with the object, create an object ID for the object, the object ID including the inode and modify the inode to include at least the object ID.

20 Claims, 6 Drawing Sheets

(56) References Cited

U.S. PATENT DOCUMENTS

| | | | |
|---|---|---|---|
| 9,307,025 B1* | 4/2016 | Kini | H04L 67/1097 |
| 2002/0116408 A1* | 8/2002 | Green, Jr. | G06F 3/0607 |
| 2006/0168450 A1* | 7/2006 | Yagawa | G06F 21/6218 |
| | | | 713/176 |
| 2006/0288026 A1* | 12/2006 | Zayas | H04L 67/1097 |
| 2006/0288056 A1* | 12/2006 | Yamakawa | G06F 17/3023 |
| 2007/0038697 A1* | 2/2007 | Zimran | G06F 17/302 |
| | | | 709/203 |
| 2007/0055702 A1* | 3/2007 | Fridella | G06F 17/30194 |
| 2007/0055703 A1* | 3/2007 | Zimran | G06F 17/30123 |
| 2007/0088702 A1* | 4/2007 | Fridella | G06F 17/30123 |
| 2007/0185938 A1* | 8/2007 | Prahlad | G06F 17/30212 |
| 2008/0077590 A1* | 3/2008 | Pandit | G06F 11/1435 |
| 2009/0271418 A1 | 10/2009 | Vaghani et al. | |
| 2012/0290629 A1 | 11/2012 | Beaverson et al. | |
| 2013/0086264 A1* | 4/2013 | Kini | H04L 47/803 |
| | | | 709/225 |
| 2013/0110891 A1 | 5/2013 | Ogasawara et al. | |

OTHER PUBLICATIONS

Salmon et al., "Putting Home Storage Management into Perspective," Paper, Parallel Data Laboratory, Carnegie Mellon University, CMU-PDL-06-110, Sep. 2006, pp. 1-23.
Office Action from Chinese Patent Application No. 201580012914. 2, dated Apr. 3, 2018.

* cited by examiner

ACCELERATED ACCESS TO OBJECTS IN AN OBJECT STORE IMPLEMENTED UTILIZING A FILE STORAGE SYSTEM

BACKGROUND

The present invention relates to accessing objects in an object store, and more specifically, this invention relates to accelerated access to objects that have been stored in an object store which utilizes a file storage system for its implementation.

Object store is a storage technique that is useful in many different storage systems, including cloud storage, among others, where object store is the most prominent storage used (e.g., object-based storage solution by IBM Corp. (Soft-Layer), Azure by Microsoft Corp., S3 by Amazon.com, Inc., etc.). Object storage, is mainly intended to handle exponential growth of unstructured data. Unlike traditional storage of files in network-attached storage (NAS) or blocks in a storage area network (SAN), object store uses data objects. Each object is assigned a unique object identifier (ID) and each object contains its own metadata (part of which is user defined metadata, like tags associated with objects) along with actual data, thereby removing the need for centralized indexing. The user defined metadata (or tags) is a strong differentiator of object store-based storage techniques and is used extensively throughout object store. Thus, it enables massive scalability and geographic independence of storage locations, while maintaining reasonable costs.

The important elements of an object store are "objects" and "containers." The objects and containers in the object store are identified with an object ID. The object ID is an universally unique ID (UUID) given to a particular object or container in a particular object store. The key usage and purpose of object ID is to allow for easy retrieval of objects and containers.

Depending on the particular implementation of object store, the object ID may be referred to as an object name, an object key, or by some other name, but will be referred to as object ID throughout. Accessing these objects/containers is made easy by just providing the object ID while requesting the object/container. This hides the implementation details from the end user and management of the objects is simplified. Most implementations of object store use a file system to store the objects and containers. In a file system semantic, a full path is provided to a file and/or directory to access a particular file or directory. So in a file system semantic, depending on the location in the file system, the objects and/or containers will have different path names. This can be very easily observed when the object association is moved from one container to another, and then the same object gets a different path, thereby making it difficult to manage. Therefore, using an object ID is the preferred mechanism for accessing the objects/containers.

One of the biggest needs in cloud based object store is to improve overall performance. This calls for optimizing the object store system. One way to optimize the object store system is to optimize the object retrieval process which may lead to increased performance. Particularly, in an object store implementation, such as one based on cloud data management interface (CDMI), OpenStack Swift, etc., the objects are being stored on a file system, with each object mapping to a file and each container mapping to a directory. Inside the file system, there is no object and everything is being accessed/operated as a file. To the outside world, the objects are allowed and preferred to be referred to as object IDs. These object IDs are unique and both objects and containers may be accessed with an object ID.

When one tries to access the object/container using an object ID, then at the object store server (which is responding to the requests), there needs to be a mapping made available from the object ID to the file path name, and then the path name may be used for further processing. Considering a huge number of objects being stored in a cloud environment, mapping from object ID to file path name becomes time consuming and is one of the constraining factors for object store performance related to retrieval of data.

A generic method being followed to solve this issue is to maintain an in-memory copy of this mapping. When a very large number of such records is stored, this represents an impractical solution. Another mechanism would be to create a database which will keep this mapping information keeping the object ID as a primary key. The second method uses less memory, but is more computationally intensive. The huge list of object IDs may need to be searched in order to find the one object in the request, and then to retrieve the associated file name.

Hence, smarter object ID generation and mapping would be beneficial to help optimize the system with regard to performance and memory.

BRIEF SUMMARY

In one embodiment, a method for creating an object includes creating an object in an object store making use of a file system, obtaining an index node (inode) identifier (ID) for an inode associated with the object, creating an object ID for the object, wherein the object ID is unique from any other object IDs in the object store, merging the object ID with the inode ID, and modifying the inode to include at least the object ID.

In another embodiment, a computer program product for accessing an object includes a computer readable storage medium having program code embodied therewith, the program code readable and/or executable by a processor to cause the processor to: extract, by the processor, an inode ID from an object ID associated with an object stored in an object store making use of a file system, access, by the processor, an inode associated with the inode ID and determine an object ID stored therein, determine, by the processor, whether the object ID from the inode matches the object ID associated with the object from which the inode ID was extracted, and perform, by the processor, an operation on the object.

In yet another embodiment, a system includes a processor and logic integrated with and/or executable by the processor, the logic being configured to: create an object in an object store making use of a file system, obtain an inode ID for an inode associated with the object, create an object ID for the object, the object ID including the inode ID, wherein the object ID is unique from any other object IDs in the object store, and modify the inode to include at least the object ID.

Other aspects and embodiments of the present invention will become apparent from the following detailed description, which, when taken in conjunction with the drawings, illustrate by way of example the principles of the invention.

DETAILED DESCRIPTION

Figure 1:
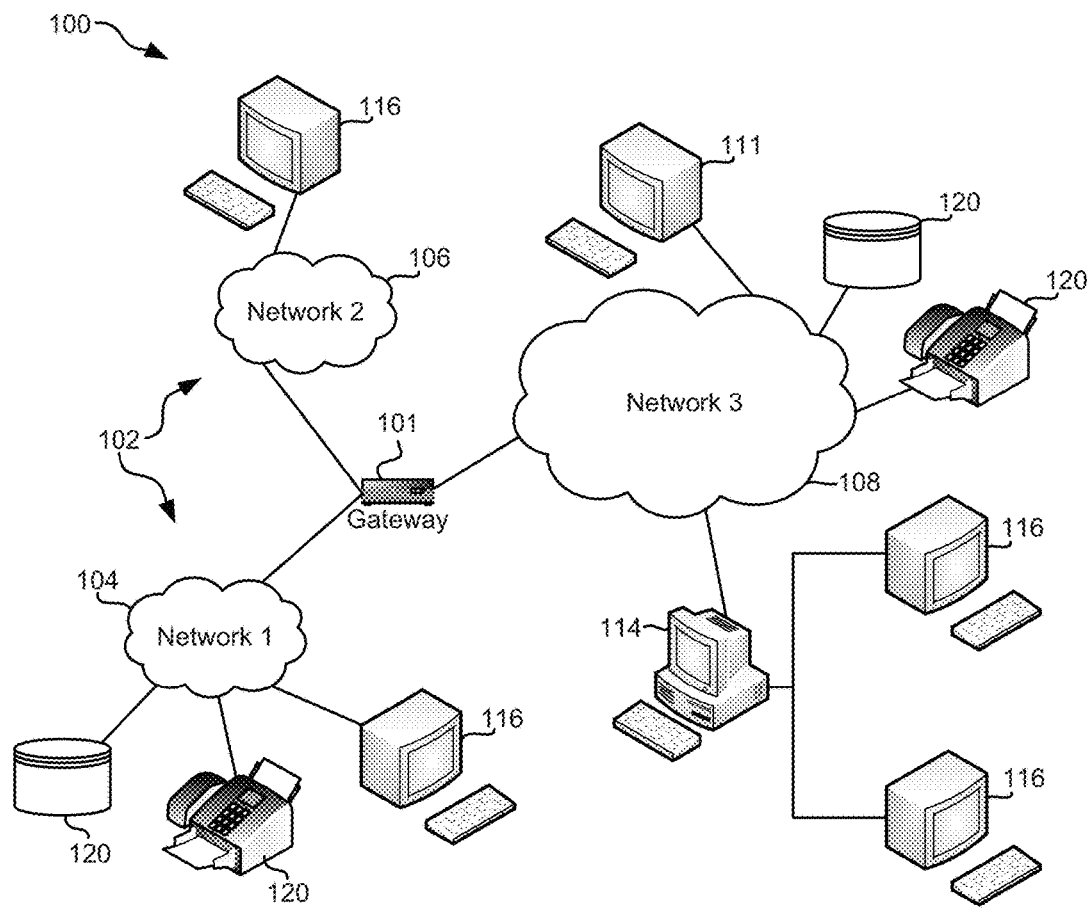
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for enhancing a file system metadata layer to be cognizant of an object store residing over the file system and an object identifier (ID) associated with the object belonging to the object store. The technique helps improve on the performance of object look-up/retrieval for the object store.

In one general embodiment, a method for creating an object includes creating an object in an object store making use of a file system, obtaining an index node (inode) identifier (ID) for an inode associated with the object, creating an object ID for the object, wherein the object ID is unique from any other object IDs in the object store, merging the object ID with the inode ID, and modifying the inode to include at least the object ID.

In another general embodiment, a computer program product for accessing an object includes a computer readable storage medium having program code embodied therewith, the program code readable and/or executable by a processor to cause the processor to: extract, by the processor, an inode ID from an object ID associated with an object stored in an object store making use of a file system, access, by the processor, an inode associated with the inode ID and determine an object ID stored therein, determine, by the processor, whether the object ID from the inode matches the object ID associated with the object from which the inode ID was extracted, and perform, by the processor, an operation on the object.

In yet another general embodiment, a system includes a processor and logic integrated with and/or executable by the processor, the logic being configured to: create an object in an object store making use of a file system, obtain an inode ID for an inode associated with the object, create an object ID for the object, the object ID including the inode ID, wherein the object ID is unique from any other object IDs in the object store, and modify the inode to include at least the object ID.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
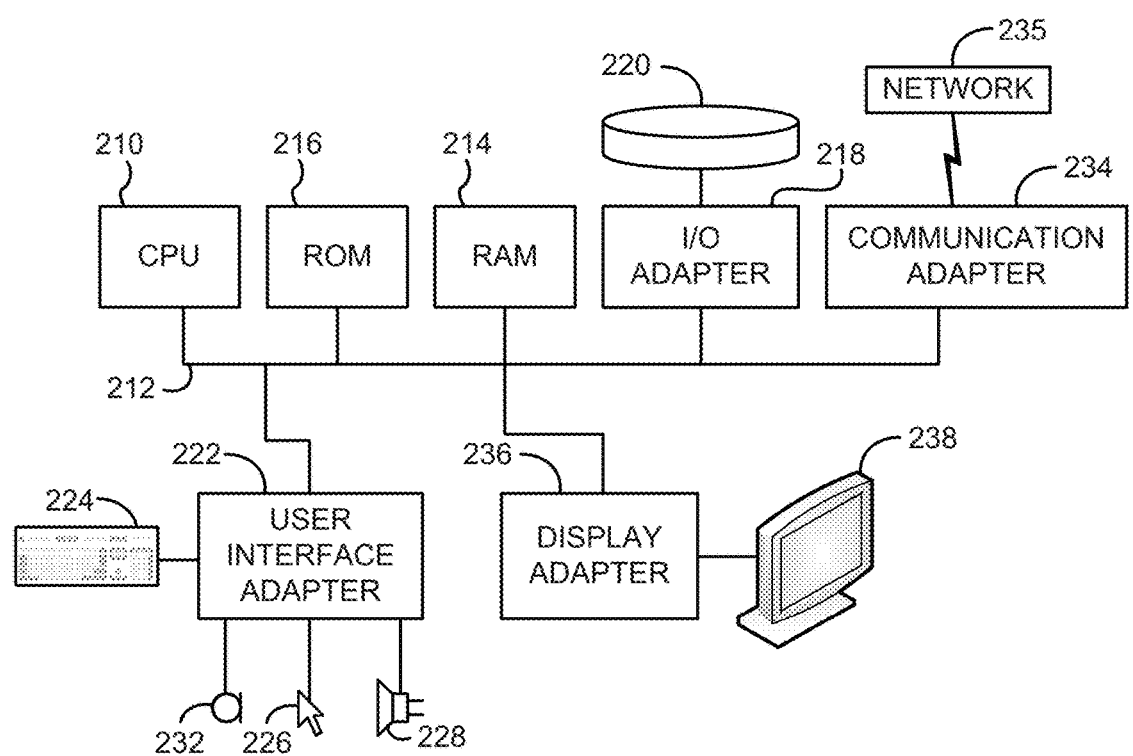
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
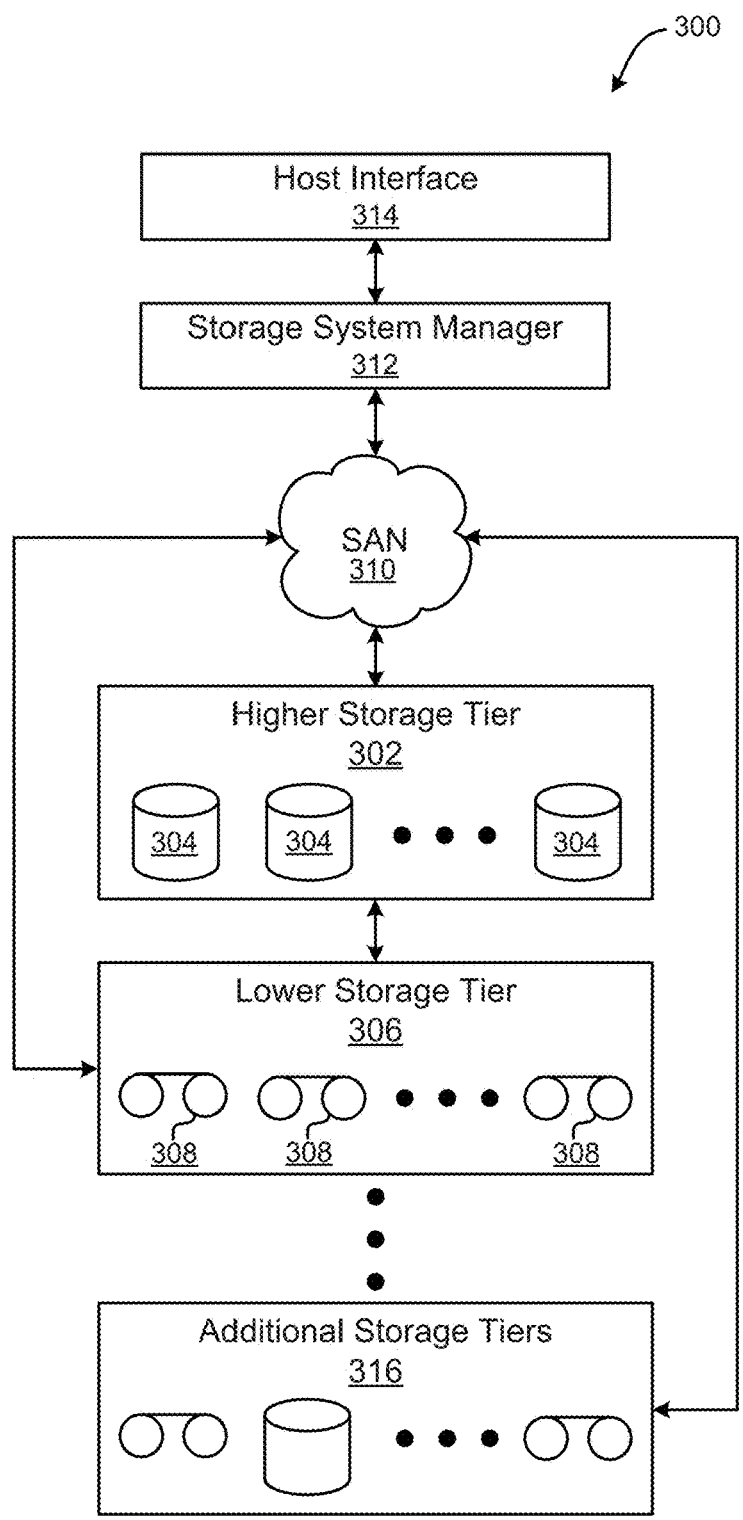
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on a higher storage tier 302 and a lower storage tier 306. The higher storage tier 302 preferably may include one or more random access and/or direct access media 304, such as hard disks in hard disk drives (HDDs), nonvolatile memory (NVM), solid state memory in solid state drives (SSDs), etc., and/or others noted herein. The lower storage tier 306 may preferably include one or more sequential access media 308, such as magnetic tape in tape drives, optical media, etc., and/or others noted herein. Additional storage tiers 316 may include any combination of storage memory media. The storage system manager 312 may communicate with the storage media 304, 308 on the higher and tower storage tiers 302, 306 through a network 310, such as a storage area network (SAN), as shown in FIG. 3. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic adapted to receive a request to open a data set, logic adapted to determine if the requested data set is stored to a lower storage tier 306 of a tiered data storage system 300 in multiple associated portions, logic adapted to move each associated portion of the requested data set to a higher storage tier 302 of the tiered data storage system 300, and logic adapted to assemble the requested data set on the higher storage tier 302 of the tiered data storage system 300 from the associated portions.

Of course, this logic may be implemented as a method on any device and/or system or as a computer program product, according to various embodiments.

In order to implement an enhanced object ID in an object store environment, some structures and/or formats are described according to various embodiments. The structures and/or formats include the object ID format, the underlying file system inode tables that hold the various objects, and object creation processing. These structures and/or formats are integrated in an object store implementation on a file system that provides improved object retrieval performance.

To reduce the resource utilization in current methods of mapping an object ID to file, data set, directory, etc., a method is proposed as described below. First, the object ID is enhanced to include an additional inode identifier such as a number, alphanumeric string, etc., that uniquely identifies the inode). The identifier may be any number, alphanumeric string, hash, etc., that uniquely identifies the inode. In place of an inode, which refers to an index node, depending on the file system being used, other file indexing structures may be utilized in the context of embodiments described herein. For example, UNIX-based systems may utilize an inode, but a MICROSOFT operating system may rely on a different indexing structure that acts similarly to an inode, as would be understood by one of skill in the art, and it is this different indexing structure which is utilized in the context of the embodiments described herein. However, for the sake of simplicity, all indexing structures will be referred to as an inode, with the assumption that any indexing structure may be used.

Figure 4:
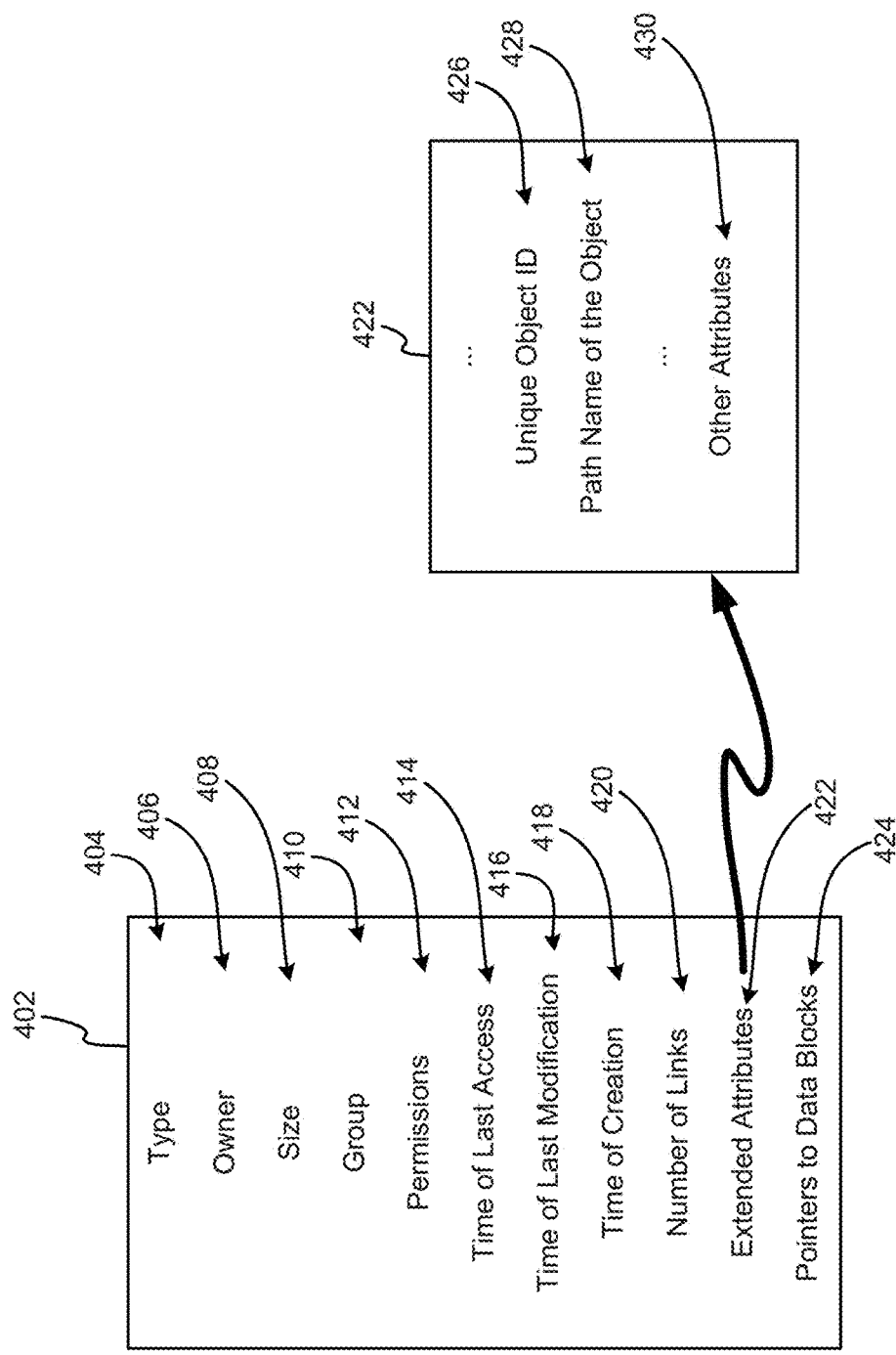
FIG. 4 shows an example of an index node (inode) structure, according to one embodiment.

An inode represents metadata about an object in an object store (or a file in a file system semantic). Referring now to FIG. 4, the metadata may include some or all of the following information: size of the file, a device ID where the file is stored, an user ID associated with the file, a group ID associated with the file, file inode information and access privileges for the owner, the group, and possibly others, one or more file protection flags, a timestamp for file creation, a timestamp for file modification, a timestamp for file access, etc., a link counter to determine a number of hard links associated with the file, one or more pointers associated with the blocks storing the file's contents, extended attributes such as append only, immutability (no one can delete file including root user), etc., or any other information known in the art.

In one embodiment, the inode may be modified to include an unique ID of the object and a path name of the object within the extended attributes field, along with any other information desired to be stored in the extended attributes field.

Most object store implementations utilize object IDs that include an universally unique identifier (UUID) at least included therein. Thus, the object ID may be enhanced to store the inode number as well as any other information that is already stored therein and/or that may be useful for other identification purposes, depending on the file system being used, in one approach. In this way, implementations of object ID may be enhanced with the addition of the inode identifier (or some other identifier of the indexing structure depending on the file system being used) related to a particular object/container. The creation of any object/container will now cause an enhanced object ID to also be created which includes the inode identifier in the object ID.

Referring again to FIG. 4, an inode 402 of the particular file system being used may also be modified to store this enhanced object ID 426 (or at least the UUID included therein) and the explicit path name of the object/container 428.

Then, whenever an object is being accessed via an object ID, and as the server or system accessing the object extracts the inode identifier from that object ID, the server will then access the respective inode information present in an inode register (such as an inode table), which allows the inode to be identified, which may include information about the object/container.

The inode 402 may include the object ID 426 associated with the object/container, such as in the extended attributes field. Other information may also be included, such as type 404, owner 406, size 408, group 410, permissions 412, last access time 414, last modified time 416, created time 418, number of links 420, extended attributes field 422, pointers to data blocks 424, etc. In one embodiment, the object ID 426 and/or the explicit path name of the object/container 428 may be stored in the extended attributes field 422 of the inode 402, along with any other attributes 430 desired to be stored in the extended attributes field 422.

Next, the object ID may be passed/requested by the end user/application and the object ID stored in the inode will be matched thereto. When a match between object IDs is confirmed, it is assured that the inode being referred to belongs to the object being requested. Then, the file name will be read from the inode, and the path obtained will be used for further processing of retrieving the object/container. This direct low level inode relation with objects via mapping and integration of object IDs and inode results in faster retrieval of objects via the object ID associated therewith.

As accessing any inode is an O(1) operation, it is guaranteed that this method of accessing an object/container is faster than any currently used methods. As there is no need to keep the mapping table/database either in-memory or on a HDD or other direct access storage device (DASD), less resources are consumed using the methods and structures described herein according to various embodiments.

For the following descriptions, it is assumed that in an object store implementation using a file system, an object is stored as a file, and a container is stored as a directory. In a file system semantic, file and directory are both stored as files in a LINUX/UNIX operating system. Information related to files/directories, referred to as metadata, may be stored in an inode.

To access any file/directory on a file system, the inode is accessed and relevant information is read therefrom. Any further tasks may also be carried out at this point. So in any case, accessing any file/directory/device Linux/Unix occurs via an access of the inode, In order to implement the methods described herein according to various embodiments, some changes may be made in the structure of the inode. In one embodiment, the object ID and the path to the object (such as a file or directory) may be stored in the extended attributes of the inode. The path to the object is used when the object store considers the permissions set on the container object.

In another embodiment, some changes may be made during an object creation process. As part of an object/container creation process, traditionally, the object ID is generated by the object store server. This object ID creation guarantees uniqueness across the object store.

However, according to one embodiment, the existing object ID is modified to include the inode identifier therein. The inode identifier may also be appended to the created object ID. This modified object ID and the path name (to the file holding the object ID on the file system) may be added to the extended attributes of that file.

Figure 5:
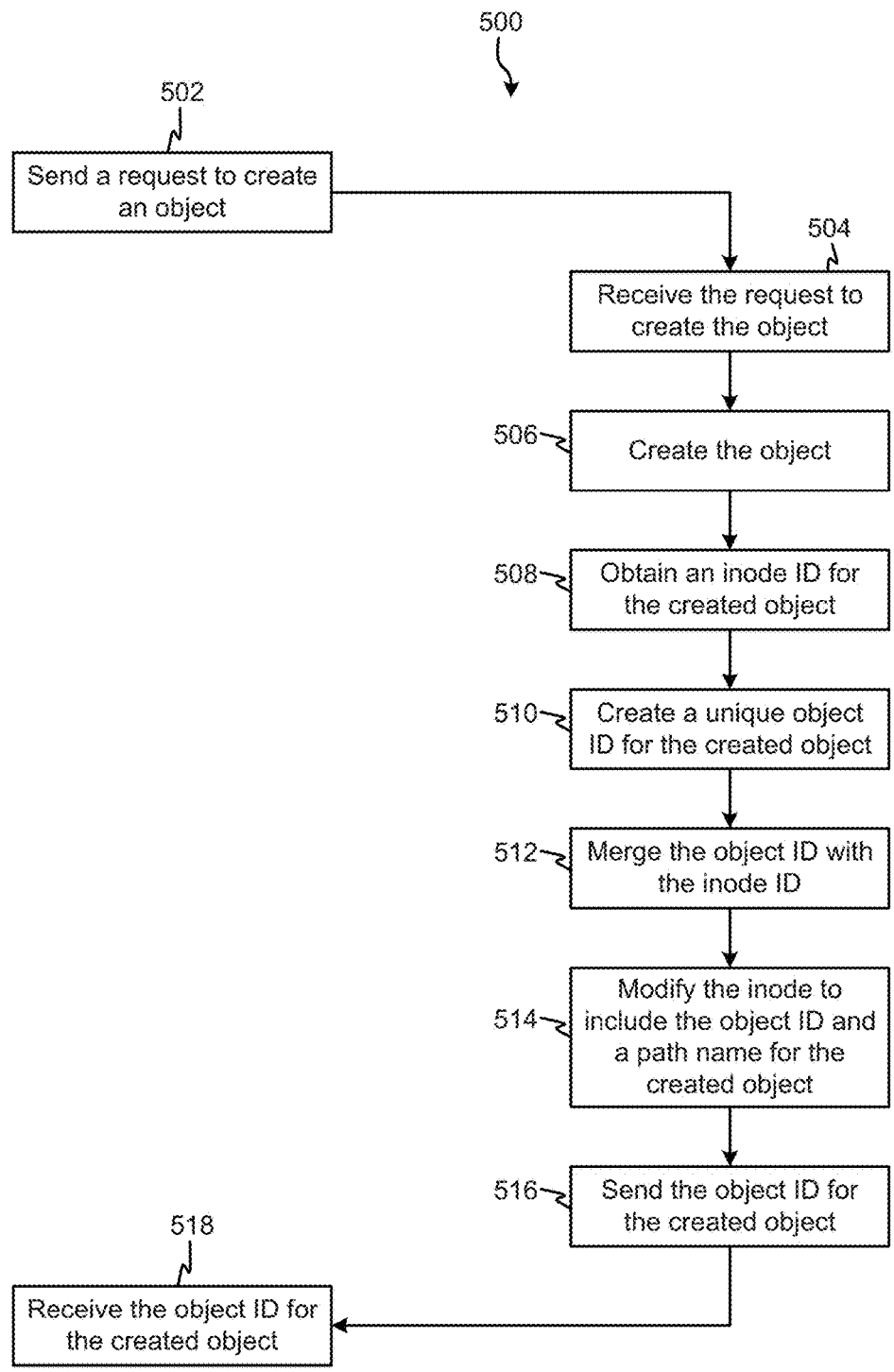
FIG. 5 is a flowchart of a method for creating an object according to one embodiment.

Now referring to FIG. 5, a flowchart of a method 500 for creating an object is shown according to one embodiment. Method 500 may be executed in any desired environment, including those shown in FIGS. 1-4, among others. Furthermore, more or less operations than those specifically described in FIG. 5 may be included in method 500.

In one embodiment, operations 502 and 518 may be performed by a client application, device, system, etc., in an attempt to create an object on the object store. In this embodiment, operations 504-516 may be performed on the object store server, file system, or some other system, application, or device connected to the object store.

In operation 502, a request to create an object is sent from a device, system, application, etc., to the object store and/or file system implementing the object store. This request may be sent by the client, a system, an application, or any other system, device, application, etc., known in the art. The request may include any information that would be useful in creating the object and/or container as would be understood by one of skill in the art.

In operation 504, the request to create the object is received by the object store and/or the file system implementing the object store, and any useful information therein is identified.

In operation 506, the object is created on the file system. The object may be of any type known in the art, such as a file, data set, directory, container, etc.

In operation 508, an inode ID, such as an inode number, is obtained for the created object. Any process of obtaining the inode ID known in the art may be used, such as by requesting the inode ID via a user interface with the file system. In one such embodiment, a user may enter a command to retrieve an inode associated with a file/directory.

One exemplary command and response exchange is shown below:
>>#ls-i test
>>21733378 test
In this exemplary exchange, 21733378 is the inode number which is returned in response to the command requesting the inode number for test.

In operation 510, a unique object ID is created for the object. The unique object ID may include a UUID, as would be understood by one of skill in the art upon reading the present descriptions. Furthermore, the object ID may take any form known in the art, such as a number, alphanumeric string, hash, etc.

In operation 512, the object ID is merged with the inode ID. In one embodiment, the inode ID may be appended to the created object ID (at a beginning thereof, an end thereof or included in some other manner that is known to the system for extraction thereof), thereby ensuring that an association between the object and the inode may be recalled at any given time from the object ID.

In operation 514, the inode is modified to include the object ID and possibly the file path of the object as metadata to the inode. These values may be stored to the extended attributes of the inode, in one embodiment. The storage of these file storage search parameters allows a search to be performed for the object without needing to consult an index or other correlation structure to determine a location of the object outside of the inode. Furthermore, since the inode ID is provided in the object ID, it is known where to find the information to locate the object in the file system.

In operation 516, the object ID is sent (returned) to the client, system, application, or other device which sent the request.

In operation 518, the object ID is received. Once the client, system, application, or other device which requested the object to be created receives the object ID, any future access requests (read, write, etc.) to that object may be made via the object ID, thereby speeding up the process of accessing the object associated with the object ID.

Furthermore, in one approach, some changes may be made to object accessing methods. The client application, device, system, etc., may pass on the object ID (which may be provided by the object store server, at the time of creating the object) to the object store server for operations like read, modify, delete, etc. The server is configured to read the object ID. From that object ID, the server is configured to extract the inode ID (which was appended to and/or included in the object ID). Then, the server is configured to access the inode and any information stored therewith, such as in its extended attributes.

Next, the stored object ID is compared with the object ID that was received. When the two object IDs match, the intended operation is allowed, otherwise, a reply is generated indicating that the object is not found and/or invalid.

When the object store implementation mandates permissions on containers (directories in file system semantics), then the path name stored in the object ID (such as in the extended attributes) may be used to check the permissions. Unmodified object store has no concept of permissions on container objects.

In this way, when utilizing object store, a second metadata may be merged with each object ID to provide object storage search parameters to more efficiently access the object in the object store.

Figure 6:
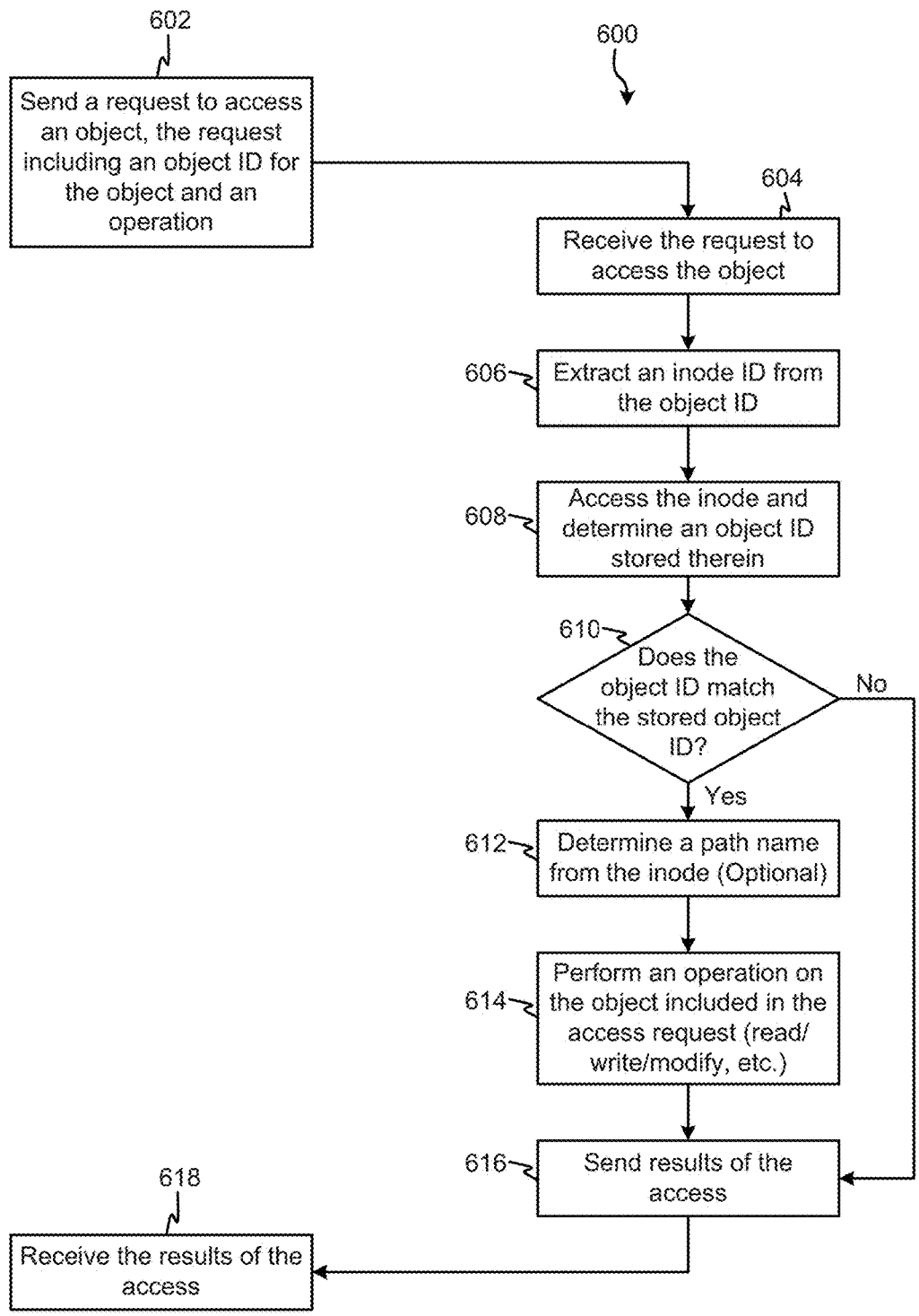
FIG. 6 is a flowchart of a method for accessing an object according to one embodiment.

Now referring to FIG. 6, a flowchart of a method 600 for accessing an object is shown according to one embodiment. Method 600 may be executed in any desired environment, including those shown in FIGS. 1-4, among others. Furthermore, more or less operations than those specifically described in FIG. 6 may be included in method 600.

In one embodiment, operations 602 and 618 may be performed by a client application, device, system, etc., in an attempt to create an object on the object store. In this embodiment, operations 604-616 may be performed on the object store server, file system, or some other system, application, or device connected to the object store.

In operation 602, a request to access an object is sent from a device, system, application, etc., to the object store and/or file system implementing the object store. This request may be sent by any client system, device, application, etc., known in the art. The request may include any information that would be useful in accessing the object and/or container as would be understood by one of skill in the art. In one embodiment, the request includes an object ID associated with the object to be accessed. In a further embodiment, an operation to be performed on the object is also included in the request (i.e., read/write/modify, etc.).

In operation 604, the request to access the object is received by the object store and/or the file system implementing the object store, and any useful information therein is identified, including the object ID for the object to be accessed.

In operation 606, an inode ID, such as an inode number, is extracted from the object ID.

In operation 608, the inode associated with the inode ID is accessed and an object ID stored therein is determined. This may be accomplished by reading the inode associated with the inode ID.

In operation 610, it is determined whether the object ID included in the request matches with an object ID included in the inode associated with the inode ID. When the object IDs match, method 600 continues to optional operation 612; otherwise, method 600 proceeds to operation 616.

In operation 612, a path name stored in the inode is determined, should the path name be required for further processing of the object. Operation 612 is not performed when the path name is not required for further processing of the object.

In operation 614, the operation included in the request is performed on the object, such as reading a portion or all of the object, writing over a portion or all of the object, appending information to the object, modifying the object, deleting the object, etc.

In operation 616, results of the access are sent, such as back to the client system, device, application, etc., which originally sent the request. When the object IDs do not match, the results indicate that the object does not exist or is not accessible, and/or the operation failed. For any of the other operations, results of the read/write/modify are indicated to the requesting entity.

In operation 618, results of the access are received, such as by the client, system, application, or other device which sent the request.

The present invention may be a system, a method, and/or a computer program product. The computer program product may include a computer readable storage medium (or media) having computer readable program instructions thereon for causing a processor to carry out aspects of the present invention.

For example, in one embodiment, a computer program product for accessing an object may comprise a computer readable storage medium having program code embodied therewith, the program code readable and/or executable by a processor to cause the processor to: extract, by the processor, an index node (inode) identifier (ID) from an object ID associated with an object stored in an object store making use of a file system, access, by the processor, an inode associated with the inode ID and determine an object ID stored therein, determine, by the processor, whether the object ID from the inode matches the object ID associated with the object from which the inode ID was extracted, and perform, by the processor, an operation on the object.

In various embodiments, the program code readable and/or executable by the processor may further causes the processor to: receive a request to access the object stored in the object store from a remote system and send results of accessing the object after performing the operation thereon to the remote system, wherein the request includes the object ID associated with the object to be accessed, and the operation to perform on the object. In another embodiment, the operation to perform on the object may include at least one of reading, writing, and modifying. According to another embodiment, the program code readable and/or executable by the processor may further cause the processor to determine a path name from the inode when the path name is required for further processing of the object.

In another example, a system may comprise a processor and logic integrated with and/or executable by the processor, the logic being configured to: create an object in an object store making use of a file system, obtain an inode ID for an inode associated with the object, create an object ID for the object, the object ID including the inode ID, wherein the object ID is unique from any other object IDs in the object store, and modify the inode to include at least the object ID.

In various embodiments, the logic may be further configured to: receive a request to create the object in the object store from a remote system prior to creating the object, and send the object ID for the object to the remote system after creating the object. In another embodiment, the logic may be further configured to modify the inode to include a path name for the object, wherein extended attributes of the inode may be modified to include the object ID and the path name for the object.

In another embodiment, the object ID may have the inode ID appended thereto, such as at a start or an end thereof. In further embodiments, the logic may be further configured to: extract the inode ID from the object ID associated with the object stored in the object store, access the inode associated with the inode ID and determine an object ID stored therein, determine whether the object ID from the inode matches the object ID associated with the object from which the inode was extracted, and perform an operation on the object.

In some approaches, the logic may be further configured to: receive a request to access the object stored in the object store from a remote system, and send results of accessing the object after performing the operation thereon to the remote system.

Furthermore, any of the following is possible: the request includes the object ID associated with the object to be accessed, and the operation to perform on the object, the operation to perform on the object includes at least one of reading, writing, and modifying, and the logic may be further configured to determine a path name from he inode when the path name is required for further processing of the object.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic, software logic such as firmware, operating system, etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for creating an object, the method comprising:
    creating an object in an object store making use of a file system;
    obtaining an index node (inode) identifier (ID) for an inode associated with the object;
    creating an object ID for the object, wherein the object ID is unique from any other object IDs in the object store;
    merging the inode ID into the object ID to create a merged object ID that includes the inode ID in its entirety, the inode ID being extractable from the merged object ID; and
    modifying the inode to include at least the merged object ID.

2. The method as recited in claim 1, further comprising:
    receiving a request to create the object in the object store from a remote system prior to creating the object; and
    sending the merged object ID for the object to the remote system after creating the object.

3. The method as recited in claim 1, further comprising:
    modifying the inode to include a path name for the object to provide search parameters for the object,
    wherein a totality of the inode ID is appended to a beginning or an end of the object ID to create the merged object ID.

4. The method as recited in claim 1, further comprising adding the object ID and a path name for the object to extended attributes of the inode.

5. The method as recited in claim 1, further comprising merging second metadata with the merged object ID, the second metadata comprising object storage search parameters, wherein the object ID has the inode ID appended thereto to create the merged object ID.

6. A computer program product for accessing an object, the computer program product comprising a computer readable storage medium having program code embodied therewith, the program code readable and/or executable by a processor to cause the processor to:
    extract, by the processor, an index node (inode) identifier (ID) in its entirety from an object ID associated with an object stored in an object store making use of a file system;
    access, by the processor, an inode associated with the inode ID and determine an object ID stored therein;
    determine, by the processor, whether the object ID from the inode matches the object ID associated with the object from which the inode ID was extracted; and
    perform, by the processor, an operation on the object.

7. The computer program product as recited in claim 6, wherein the program code readable and/or executable by the processor further causes the processor to:
    receive a request to access the object stored in the object store from a remote system; and
    send results of accessing the object after performing the operation thereon to the remote system.

8. The computer program product as recited in claim 7, wherein the request includes the object ID associated with the object to be accessed, and the operation to perform on the object.

9. The computer program product as recited in claim 6, wherein the operation to perform on the object includes at least one of reading, writing, and modifying, and wherein a totality of the inode ID is appended to the object ID.

10. The computer program product as recited in claim 6, wherein the program code readable and/or executable by the processor further causes the processor to determine a path name from the inode in response to a determination that the path name is required for further processing of the object.

11. A system, comprising a processor and logic integrated with and/or executable by the processor, the logic being configured to:
create an object in an object store making use of a file system;
obtain an index node (inode) identifier (ID) for an inode associated with the object;
create an object ID for the object, the object ID including the inode ID in its entirety, wherein the object ID is unique from any other object IDs in the object store and the inode ID is extractable from the object ID; and
modify the inode to include at least the object ID.

12. The system as recited in claim 11, wherein the logic is further configured to:
receive a request to create the object in the object store from a remote system prior to creating the object; and
send the object ID for the object to the remote system after creating the object.

13. The system as recited in claim 11, wherein the logic is further configured to modify the inode to include a path name for the object.

14. The system as recited in claim 11, wherein the logic is further configured to add the object ID and a path name for the object to extended attributes of the inode.

15. The system as recited in claim 11, wherein the object ID has the inode ID appended thereto, and wherein a totality of the inode ID is appended to a beginning or an end of the object ID.

16. The system as recited in claim 11, wherein the logic is further configured to:
extract the inode ID from the object ID associated with the object stored in the object store;
access the inode associated with the inode ID and determine an object ID stored therein;
determine whether at the object ID from the inode matches the object ID associated with the object from which the inode ID was extracted; and
perform an operation on the object when the object ID from the inode matches the object ID associated with the object from which the inode ID was extracted.

17. The system as recited in claim 16, wherein the logic is further configured to:
receive a request to access the object stored in the object store from a remote system; and
send results of accessing the object after performing the operation thereon to the remote system.

18. The system as recited in claim 17, wherein the request includes the object ID associated with the object to be accessed, and the operation to perform on the object.

19. The system as recited in claim 16, wherein the operation to perform on the object includes at least one of reading, writing, and modifying.

20. The system as recited in claim 16, wherein the logic is further configured to determine a path name from the inode in response to a determination that the path name is required for further processing of the object.

* * * * *